United States Patent
Iijima

(10) Patent No.: US 7,895,902 B2
(45) Date of Patent: Mar. 1, 2011

(54) ELECTROMAGNETIC FLOW METER INCLUDING CIRCUMFERENTIAL GROOVES ON AN INNER SURFACE OF A MEASUREMENT PIPE FOR FIXING A LINER

(75) Inventor: Takuya Iijima, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 110 days.

(21) Appl. No.: 12/352,778

(22) Filed: Jan. 13, 2009

(65) Prior Publication Data
US 2009/0178489 A1   Jul. 16, 2009

(30) Foreign Application Priority Data
Jan. 15, 2008   (JP) .............. P2008-005241

(51) Int. Cl.
*G01F 1/58* (2006.01)
(52) U.S. Cl. .................................. 73/861.11
(58) Field of Classification Search ........... None
See application file for complete search history.

(56) References Cited

U.S. PATENT DOCUMENTS

| | | | | |
|---|---|---|---|---|
| 3,453,008 | A | * | 7/1969 | Lejeune ............... 285/222.4 |
| 3,735,475 | A | * | 5/1973 | Marriott ................ 29/455.1 |
| 3,925,881 | A | * | 12/1975 | Bowcott ................... 29/597 |
| 5,664,315 | A | * | 9/1997 | Unterseh ............... 73/861.11 |
| 7,178,407 | B2 | * | 2/2007 | Kappertz et al. ....... 73/861.11 |
| 2009/0293635 | A1 | * | 12/2009 | Iijima ................. 73/861.11 |

FOREIGN PATENT DOCUMENTS

| | | | |
|---|---|---|---|
| CN | 2669143 Y | | 1/2005 |
| JP | 59-16622 | | 1/1984 |
| JP | 61-16493 | | 5/1986 |
| JP | 2-39214 | | 10/1990 |
| JP | 3-124 | | 1/1991 |
| JP | 4-236892 | | 8/1992 |
| JP | 05018800 A | * | 1/1993 |
| JP | 2002-39821 | | 2/2002 |

\* cited by examiner

*Primary Examiner* — Harshad Patel
(74) *Attorney, Agent, or Firm* — Oblon, Spivak, McClelland, Maier & Neustadt, L.L.P.

(57) ABSTRACT

An electromagnetic flow meter has a pipe body 16 in which a measurement target fluid flows. The pipe body 16 includes: a measurement pipe 1 having a groove 3 whose cross-section is any of a semicircular shape, a rectangular shape, and a triangular shape formed on an inner surface in a circumferential direction; and a resin lining portion 10a formed on the inner surface of the measurement pipe.

3 Claims, 10 Drawing Sheets

ELECTROMAGNETIC FLOW METER INCLUDING CIRCUMFERENTIAL GROOVES ON AN INNER SURFACE OF A MEASUREMENT PIPE FOR FIXING A LINER

CROSS REFERENCE TO RELATED APPLICATION

This application is based upon and claims the benefit of priority from Japanese Patent Application No. 2008-005241 filed on Jan. 15, 2008, the entire contents of which are incorporated herein by reference.

BACKGROUND OF THE INVENTION

1. Field of the Invention

The present invention relates to an electromagnetic flow meter configured to measure a flow rate of a fluid. More specifically, the present invention relates to a technique to apply a resin lining on an inner surface of a measurement pipe in which a measurement target fluid is to flow.

2. Description of the Related Art

An electromagnetic flow meter is configured to measure a flow rate by applying an electric current to a coil to generate a magnetic field inside a measurement pipe, and by detecting magnitude of an electromotive force generated in proportion to the electric conductivity of a liquid flowing inside the measurement pipe. Generally, a resin lining made of fluororesin, polyurethane resin or the like is applied on an inner surface of the measurement pipe of the above-described electromagnetic flow meter in order to prevent embrittlement.

Transfer molding is known as a method for applying a resin lining in an electromagnetic flow meter. This method involves the following steps: fitting molds to both ends and the inside of a measurement pipe; heating these molds up to a temperature close to a melting point of resin used for lining; and pressurizing melted resin to feed the resin into clearances between the measurement pipe and the molds.

In another method for applying a resin lining, the method involves the following steps: fitting molds to both ends and the inside of a measurement pipe; and pressurizing melted resin without heating the resin to feed the resin into clearances between the measurement pipe and the molds.

Further, in another method for applying a resin lining, the method involves the following steps: fitting molds to both ends and the inside of a measurement pipe; putting resin pellets used for lining into clearances between the measurement pipe and the molds in advance; heating the resin pellets until the pellets are melted in the clearances between the measurement pipe and the molds; and thereafter, pressurizing and molding the resin by clipping the molds with a press machine or the like.

Regarding the conventional electromagnetic flow meter including the measurement pipe to which the resin lining is applied, there is known a technique for preventing the resin lining from being detached from the measurement pipe. This technique forms the lining by feeding the resin after attaching a cylindrical porous plate serving as a reinforcing member onto the inner surface of the measurement pipe.

Japanese Examined Patent Application Publication No. 03-124 (Patent Document 1) discloses a forming method of pipe lining for an electromagnetic flow meter. According to this method, a porous plate is used as a reinforcing member buried in resin. The porous plate is firstly wound cylindrically so as to be inserted into a measurement pipe, thereby forming a porous pipe body. Next, a spacer is fitted to an outer peripheral surface of this porous pipe body. The porous pipe body provided with the spacer is then inserted into the measurement pipe and fixed thereto. Then, the measurement pipe body is coated with resin by insertion molding. In this method, before the porous pipe body is coated with resin, the two end edges in a circumferential direction of the porous pipe body are shifted relatively to each other in an axial direction to expand the diameter of the porous pipe body, while being in close contact with each other, until an outer peripheral surface of the spacer comes in close contact with an inner peripheral surface of the measurement pipe.

Japanese Examined Utility Model Application Publication No. 02-39214 (Patent Document 2) discloses an electromagnetic flow meter including a lining that is applied on an inner surface of a conducting pipe by means of insertion molding. This electromagnetic flow meter includes: a cylinder provided with a fastener which is fixed to the inner surface of the conducting pipe and which is configured to establish fastening integrally with the lining; a reinforcing member provided with through holes formed at least along a seam of the cylinder; and a lining fastener which is provided on the conductive pipe to face the though holes and which is configured to prevent detachment of the lining.

Japanese Examined Utility Model Application Publication No. 61-16493 (Patent Document 3) discloses a technique to prevent detachment of a resin lining from a measurement pipe without using a reinforcing member. According to this technique, dovetail grooves are formed on an inner surface of the measurement pipe either in a circumferential direction or in an axial direction, and the lining is formed by feeding resin thereafter.

SUMMARY OF THE INVENTION

According to the above-described techniques disclosed in Patent Document 1 and Patent Document 2, the cylindrical porous plate is used for avoiding detachment of the resin lining from the measurement pipe. However, advanced process techniques are required for forming the porous plate into a cylindrical shape. Moreover, advanced forming techniques are required for welding the cylindrical porous plate to the measurement pipe in order to avoid detachment of the cylindrical porous plate from the measurement pipe.

Further, in order to feed the melted resin into the clearance between the cylindrical porous plate and the measurement pipe and into pores on the cylindrical porous plate without including any bubbles in the resin, it is necessary to employ a method, such as transfer molding, injection molding or insertion molding, of heating molds to raise the temperature thereof, and thereafter pressuring the melted resin to feed the resin into the molds. As a result, these techniques require large costs for formation as well as the advanced forming techniques.

In addition, according to the above-described technique disclosed in Patent Document 3, the dovetail grooves with the width gradually increased toward its bottom are formed on the inner surface of the measurement pipe. However, process costs will become higher when numerous dovetail grooves are formed.

Moreover, even if the dovetail grooves are successfully formed at the ends of the measurement pipe, it is still difficult to form the dovetail grooves deep inside the measurement pipe. In order to feed the resin to sharp portions on tip ends of the dovetail grooves without including bubbles therein, it is necessary to employ a method such as transfer molding, injection molding or insertion molding. Accordingly, large costs are required for formation. In addition, the advanced forming techniques are required as well.

An object of the present invention is to provide an electromagnetic flow meter in which a resin lining is prevented from detaching from a measurement pipe at low costs by use of simple process techniques and forming techniques.

To solve the above problems, a first aspect of the present invention provides an electromagnetic flow meter comprising: a measurement pipe in which a measurement target fluid flows; and a resin lining portion formed on an inner surface of the measurement pipe; wherein the inner surface of the measurement pipe has a first groove in a circumferential direction thereof, and a cross-section of the first groove in the circumferential direction is any of a semicircular shape, a rectangular shape, and a triangular shape.

The first groove may be inclined relative to the inner surface at a predetermined angle.

The measurement pipe may further have a rectangular groove provided at a ridge portion formed by a cut surface of an end thereof and the inner surface thereof, the rectangular groove being inclined relative to the inner surface at a predetermined angle.

The electromagnetic flow meter may further comprise: flanges provided at both ends of the measurement pipe, the flanges having a second groove whose cross-section is any of a semicircular shape, a rectangular shape and a triangular shape, and is formed radially from a center of the measurement pipe; and lining flare portions each formed on a surface of the flanges.

A second aspect of the present invention provides an electromagnetic flow meter comprising: a measurement pipe in which a measurement target fluid flows; a belt-shaped spiral porous plate attached to an inner surface of the measurement pipe; and a resin lining portion formed on the inner surface of the measurement pipe and on the belt-shaped spiral porous plate.

According to the present invention, it is possible to provide an electromagnetic flow meter in which a resin lining is prevented from detaching from a measurement pipe at low costs while using simple process techniques and forming techniques.

Specifically, it is possible to reduce process costs because it is easy to process the semicircular, rectangular or triangular grooves on the inner surface of the measurement pipe.

Moreover, it is possible to reduce material costs because, unlike conventional electromagnetic flow meter, the electromagnetic flow meter of the invention does not employ a cylindrical porous plate.

Moreover, it is easy to manufacture the electromagnetic flow meter because an advanced canning technique is not required.

Further, it is possible to form the resin lining without using an advanced forming technique.

In addition, the resin in the semicircular, rectangular or triangular grooves exerts an anchoring effect to suppress detachment of the resin lining portion from the measurement pipe. The resin in the semicircular, rectangular or triangular grooves also constitutes ribs for reinforcing the lining, which exerts a reinforcing effect to prevent the resin lining from crushing inward due to a negative pressure when the pressure inside the measurement pipe turns into negative, for example.

DESCRIPTION OF THE EMBODIMENTS

Hereinafter, embodiments of the present invention will be described below in detail with reference to the accompanying drawings.

First Embodiment

Figure 1:
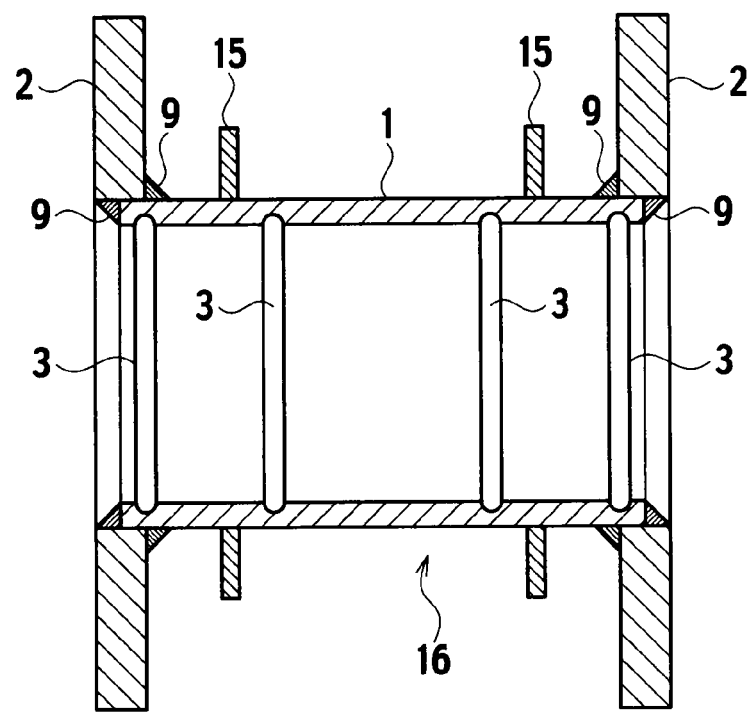
FIG. 1 is a cross-sectional view of a pipe body constituting an electromagnetic flow meter according to a first embodiment of the present invention, which shows a state before a resin lining is applied on the pipe body.

As shown in FIG. 1, a pipe body 16 includes a measurement pipe 1 in which a measurement target fluid is to flow, a pair of flanges 2 welded on both ends of the measurement pipe 1 and connected to pipes (not shown), and a pair of contents housing chamber plates 15 welded on an outer peripheral surface of the measurement pipe 1 and configured to define a chamber for housing contents such as coils. The measurement pipe 1 is made of metal or insulator such as ceramic material or the like. Multiple grooves 3 whose cross-section is a semicircular shape (hereinafter referred to as "semicircular grooves") are provided in a circumferential direction on an inner surface of the measurement pipe 1. Here, reference numeral 9 denotes a welded portion.

The pipe body 16 shown in FIG. 1 is applied with a resin lining made of fluororesin, polyurethane resin or the like. The resin lining 10 can be applied by using a publicly known method, such as a method of fitting molds to both ends and the inside of the measurement pipe 1 and then pressurizing the melted resin to feed the resin into clearances between the measurement pipe 1 and the molds.

Figure 2:
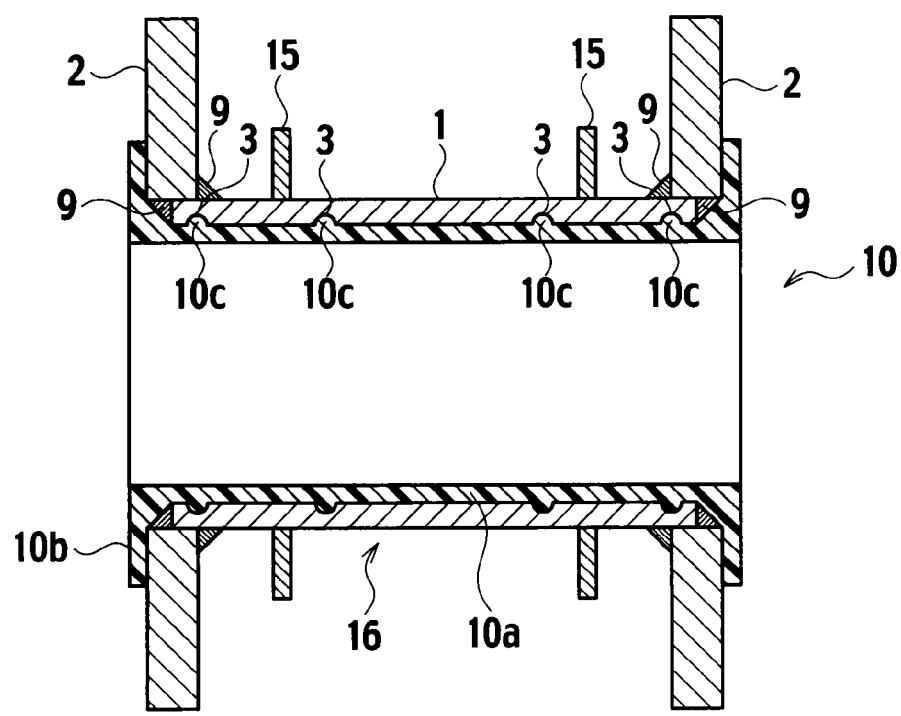
FIG. 2 is a cross-sectional view of the pipe body constituting the electromagnetic flow meter according to the first embodiment of the present invention, which shows a state after the resin lining is applied on the pipe body.

FIG. 2 is a cross-sectional view showing a state after the resin lining 10 is applied on the pipe body 16. The resin lining 10 is applied on the inner surface of the measurement pipe 1 and partially on one of surfaces of each flange 2 (the surface connected to the pipes), and includes a resin lining portion 10a and lining flare portions 10b. Here, the resin that enters the semicircular grooves 3 becomes thick and thereby forms ribs 10c.

Figure 3A:
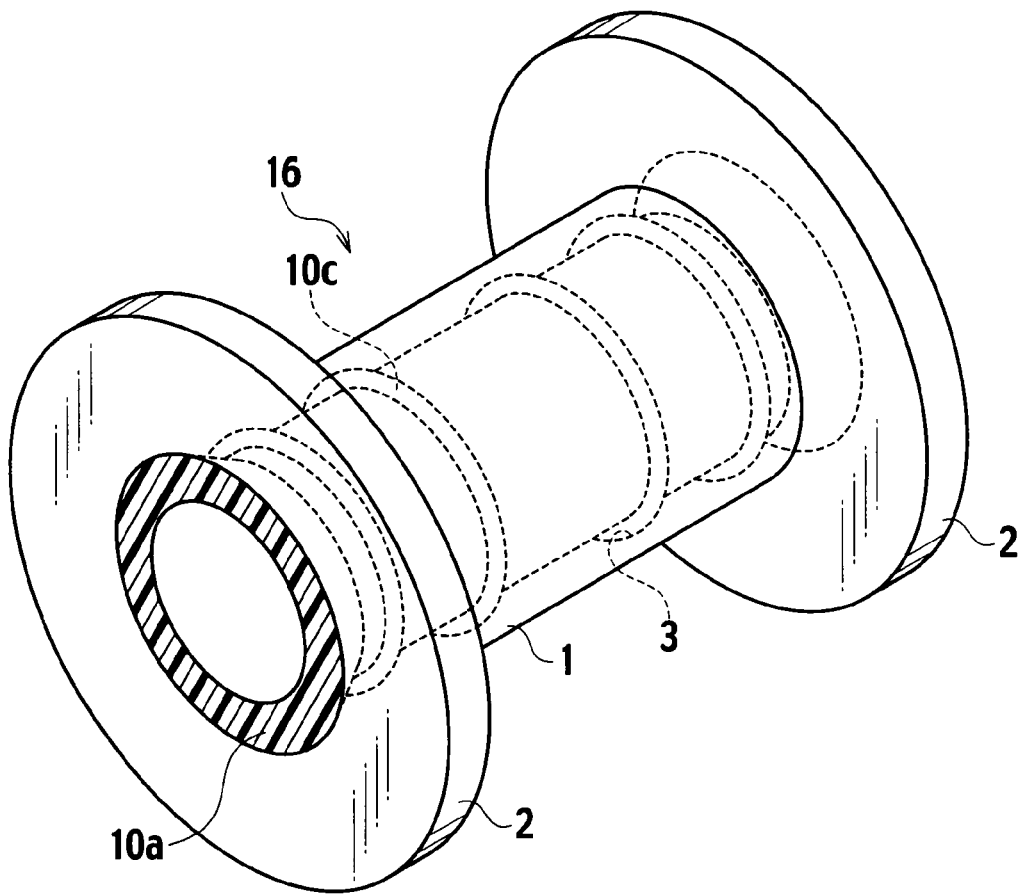
FIG. 3A is a perspective view of the pipe body constituting the electromagnetic flow meter according to the first embodiment of the present invention, which shows the state after the resin lining is applied on the pipe body.
Figure 3B:
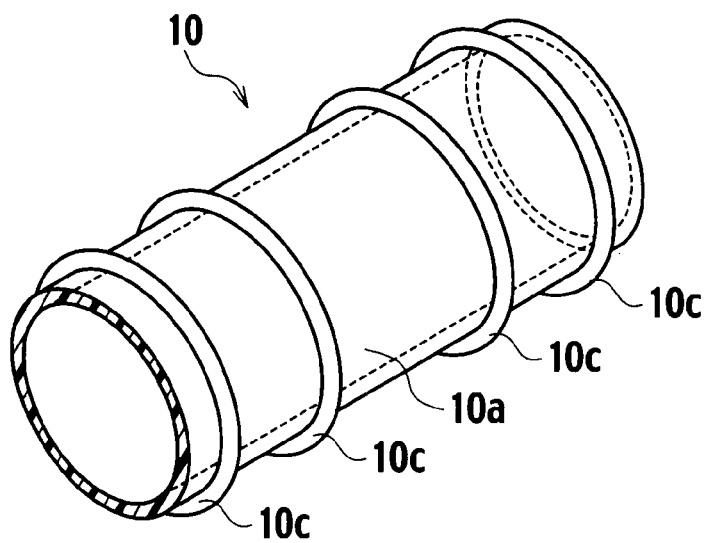
FIG. 3B is a perspective view showing only a resin lining portion shown in FIG. 3A.

FIG. 3A is a perspective view showing a state after the resin lining is applied on the pipe body 16, and FIG. 3B is a perspective view that only shows the resin lining portion 10a. Note that illustration of the lining flare portions 10b is omitted in FIGS. 3A and 3B.

In the electromagnetic flow meter according to the first embodiment, the semicircular grooves 3 are easily processed as compared to the dovetail grooves provided on the conventional electromagnetic flow meter. Moreover, unlike the conventional electromagnetic flow meter, a cylindrical porous plate is not provided at the time of forming the resin lining. Accordingly, it is possible to form the resin lining easily only by pressurizing and injecting the melted resin into the clearances between the measurement pipe 1 and the molds.

As described above, according to the electromagnetic flow meter of the first embodiment of the present invention, it is possible to reduce process costs because the semicircular grooves 3 are easily formed on the inner surface of the measurement pipe 1. Moreover, it is possible to reduce material costs because the cylindrical porous plate is not used unlike the conventional electromagnetic flow meter. Further, it is easy to manufacture the pipe body 16 of the electromagnetic flow meter because it is not necessary to apply an advanced canning technique to process the cylindrical porous plate into an accurate cylindrical shape and then to attach the cylindrical porous plate onto the inner surface of the measurement pipe so as not to cause detachment.

Moreover, since there is no cylindrical porous plate, it is possible to form the resin lining without applying an advanced forming technique to heat the molds to a high temperature and to infuse the melted resin at high pressure by use of a pressurizer in order to avoid generation of bubbles.

In addition, the resin in the semicircular grooves 3 exerts an anchoring effect for the resin lining relative to the measurement pipe 1 so as to suppress detachment of the resin lining portion 10a from the measurement pipe 1 due to resin contraction at the time of forming the resin lining. Moreover, the resin in the semicircular grooves 3 also constitutes the ribs 10c for reinforcing the lining, which exerts a reinforcing effect to avoid the resin lining portion 10a from crushing inward due to a negative pressure when the pressure inside the measurement pipe turns into negative, for example.

The shape of the grooves provided on the inner surface of the measurement pipe 1 in the electromagnetic flow meter according to the first embodiment can be modified as follows. In the following modified examples, the same constituents as those in the configuration of the electromagnetic flow meter according to the first embodiment will be designated by the same reference numerals used in the first embodiment and duplicate explanations will be omitted.

Figure 4:
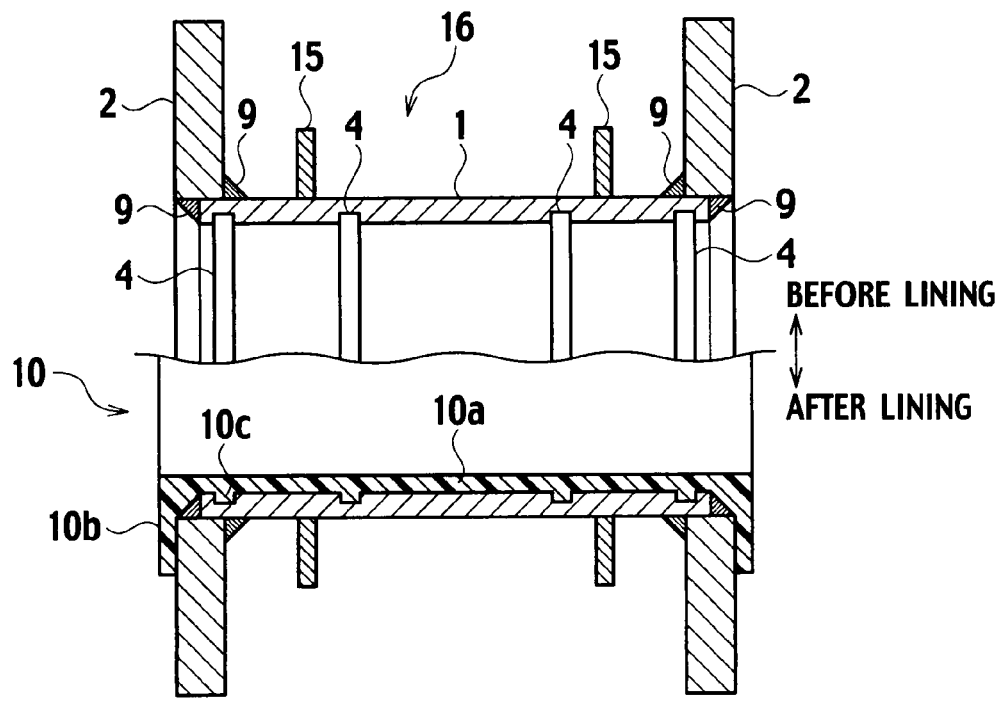
FIG. 4 is a cross-sectional view of a pipe body constituting an electromagnetic flow meter according to a first modified example of the first embodiment of the present invention.

FIG. 4 shows a first modified example of the first embodiment of the present invention. Note that an upper half in FIG. 4 shows a cross-sectional view before the resin lining 10 is applied on the pipe body 16, while a lower half shows a cross-sectional view after the resin lining 10 is applied on the pipe body 16.

In the electromagnetic flow meter according to the first modified example, the semicircular grooves 3 originally provided on the measurement pipe 1 of the pipe body 16 are changed into grooves 4 whose cross-section is a rectangular shape (hereinafter referred to as "rectangular grooves"). This electromagnetic flow meter has similar operations and effects to those achieved by the electromagnetic flow meter according to the first embodiment. In addition, the rectangular grooves 4 have larger areas that are in contact with the resin as compared to the relevant areas of the semicircular grooves 3. Therefore, this electromagnetic flow meter can increase the anchoring effect.

Figure 5:
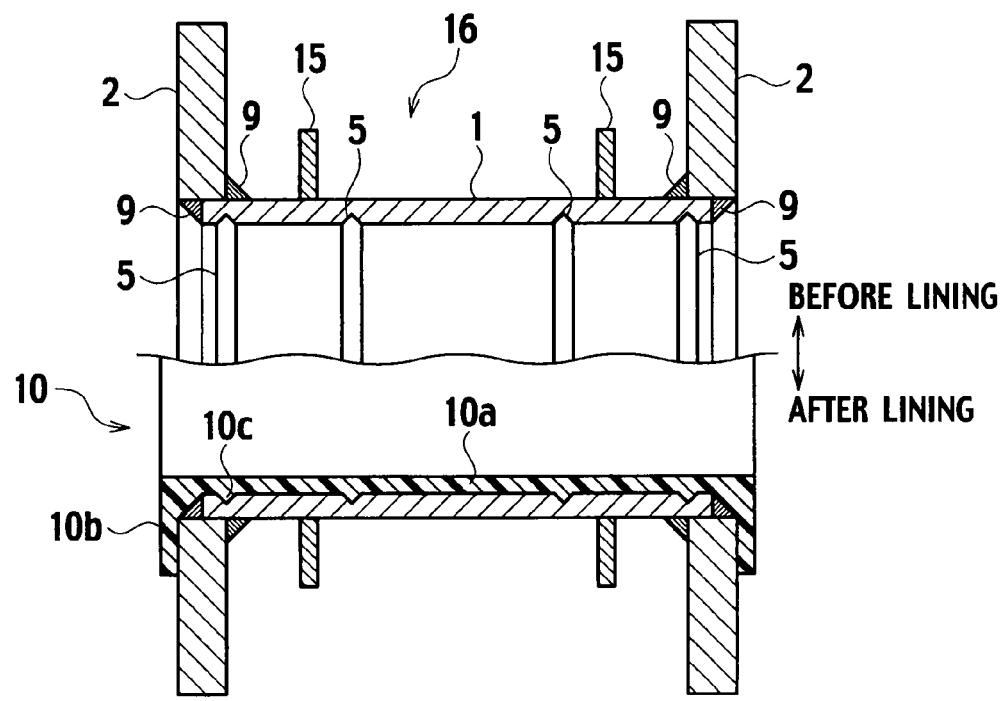
FIG. 5 is a cross-sectional view of a pipe body constituting an electromagnetic flow meter according to a second modified example of the first embodiment of the present invention.

FIG. 5 shows a second modified example of the first embodiment of the present invention. Note that an upper half in FIG. 5 shows a cross-sectional view before the resin lining 10 is applied on the pipe body 16, while a lower half shows a cross-sectional view after the resin lining 10 is applied on the pipe body 16.

In the electromagnetic flow meter according to the second modified example, the semicircular grooves 3 originally provided on the measurement pipe 1 of the pipe body 16 are changed into grooves 5 whose cross-section is a triangular shape (hereinafter referred to as "triangular grooves"). This electromagnetic flow meter has similar operations and effects to those achieved by the electromagnetic flow meter according to the first embodiment. In addition, sharp ribs 10c are formed in the triangular grooves 5. Therefore, these ribs have higher effects than the ribs formed in the semicircular grooves 3.

Figure 6:
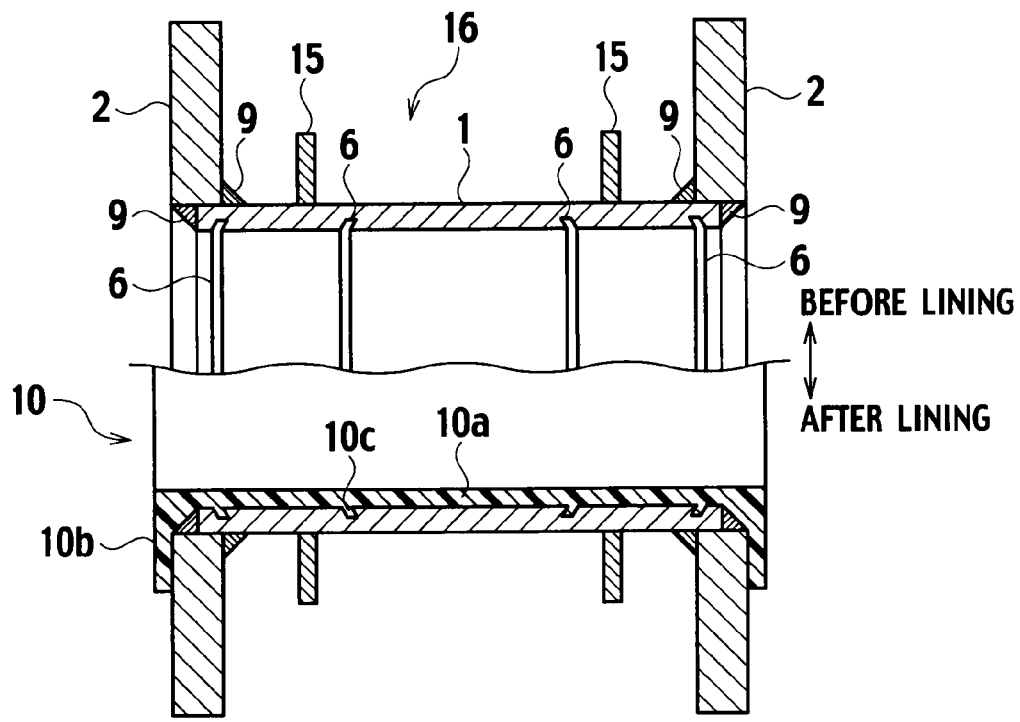
FIG. 6 is a cross-sectional view of a pipe body constituting an electromagnetic flow meter according to a third modified example of the first embodiment of the present invention.

FIG. 6 shows a third modified example of the first embodiment of the present invention. Note that an upper half in FIG. 6 shows a cross-sectional view before the resin lining 10 is applied on the pipe body 16, while a lower half shows a cross-sectional view after the resin lining 10 is applied on the pipe body 16.

In the electromagnetic flow meter according to the third modified example, the semicircular grooves 3 originally provided on the measurement pipe 1 of the pipe body 16 are changed into grooves 6 whose cross-section is a rectangular shape inclined relative to the inner surface of the measurement pipe 1 at a predetermined angle (hereinafter referred to as "inclined rectangular grooves"). This electromagnetic flow meter has similar operations and effects to those achieved by the electromagnetic flow meter according to the first embodiment. In addition, the inclined rectangular grooves 6 suppress detachment of the resin lining portion 10a from the measurement pipe 1 more efficiently than the semicircular grooves 3.

Second Embodiment

In the following description, the same constituents as those in the configuration of the electromagnetic flow meter according to the first embodiment will be designated by the same reference numerals used in the first embodiment, and duplicate explanations will be omitted.

Figure 7:
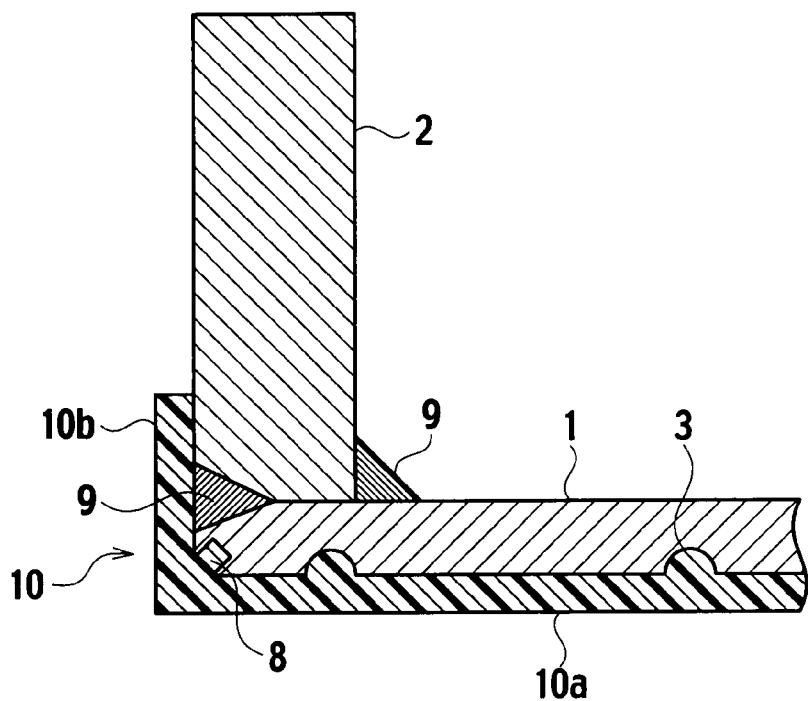
FIG. 7 is a cross-sectional view partially showing a pipe body constituting an electromagnetic flow meter according to a second embodiment of the present invention.

As shown in FIG. 7, in an electromagnetic flow meter according to the second embodiment of the present invention, a groove 8 whose cross-section is a rectangular shape inclined relative to the inner surface of the measurement pipe 1 at a predetermined angle (hereinafter referred to as an "end inclined rectangular groove") is formed at a ridge portion formed by a cut surface of an end and by the inner surface, of the measurement pipe 1 of the electromagnetic flow meter according to the first embodiment. The resin lining 10 is applied such that the resin enters the end inclined rectangular groove 8.

Figure 8:
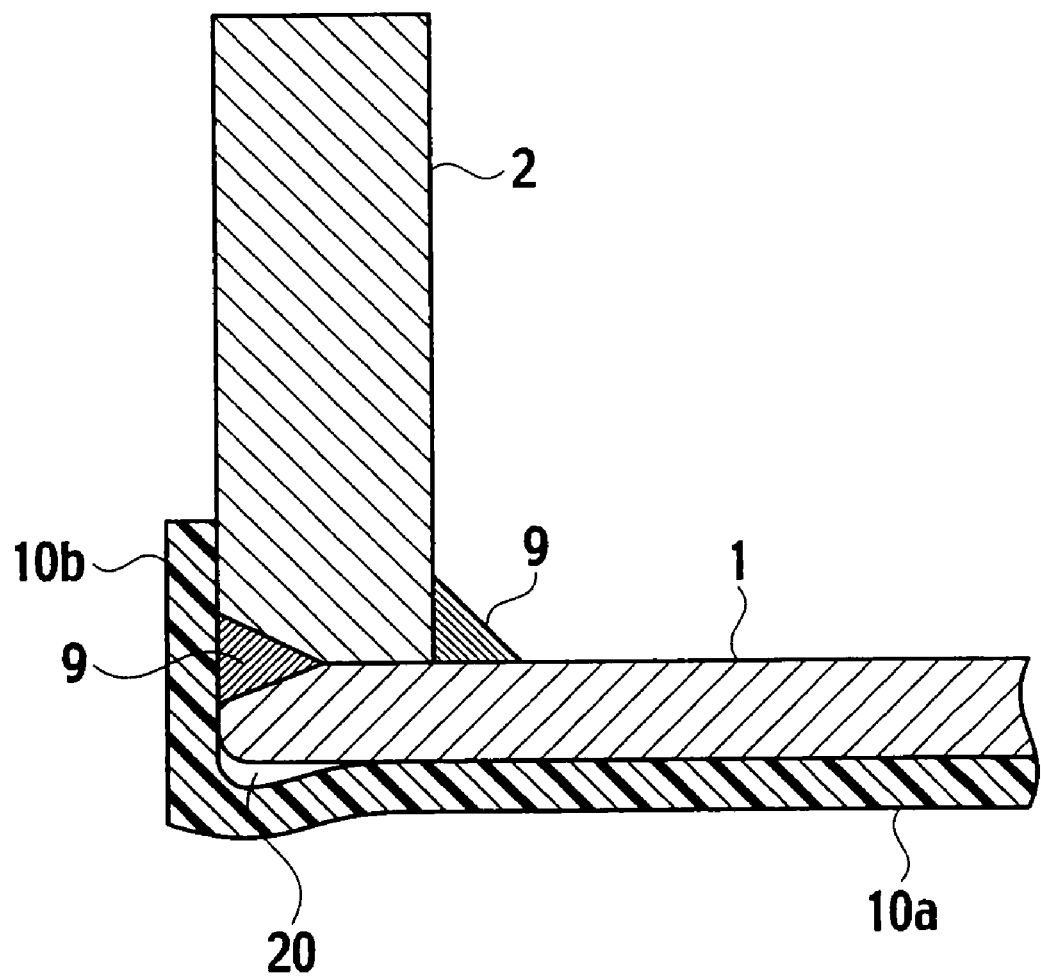
FIG. 8 is a cross-sectional view partially showing a pipe body constituting a conventional electromagnetic flow meter.

As shown in FIG. 8, if there is no end inclined rectangular groove 8, the end of the resin lining portion 10a is pressed inward (to the right side in the drawing) when the pipe (not shown) is connected. As a result, the resin lining portion 10a is detached from the inner surface of the measurement pipe 1 and protrudes into the measurement pipe 1 while generating a gap 20.

In contrast, according to the electromagnetic flow meter of the second embodiment of the present invention, it is possible to prevent detachment of the resin lining portion 10a from the inner surface of the measurement pipe 1 because the resin enters the end inclined rectangular groove 8. As a result, it is possible to reduce turbulence of the measurement target fluid and thereby to achieve higher accuracy in flow rate measurement as well as stabilization of outputs.

Third Embodiment

Figure 9:
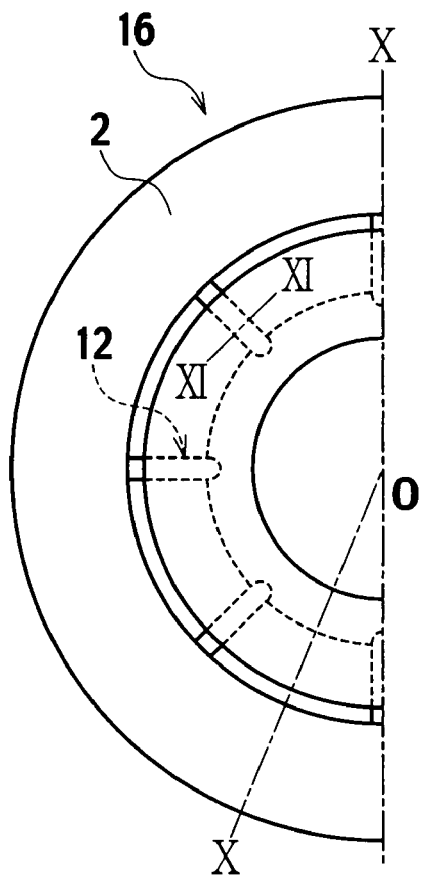
FIG. 9 is a side view showing only a half of a side surface of a pipe body constituting an electromagnetic flow meter according to a third embodiment of the present invention.
Figure 10:
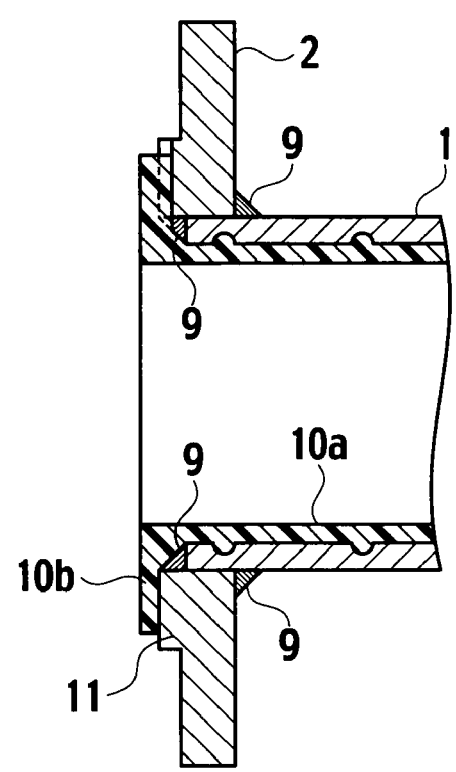
FIG. 10 is a cross-sectional view taken along an X-O-X line in FIG. 9.
Figure 11:
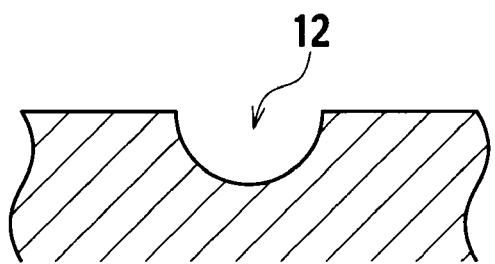
FIG. 11 is a cross-sectional view taken along an XI-XI line in FIG. 9.

FIGS. 9 to 11 show a third embodiment of the present invention. In the following description, the same constituents as those in the configuration of the electromagnetic flow meter according to the first embodiment will be designated by the same reference numerals used in the first embodiment, and duplicate explanations will be omitted.

As shown in FIGS. 9 to 11, grooves 12 each whose cross-section is a semicircular shape (hereinafter referred to as "flange seating face semicircular grooves") are formed on a surface of a flange seat 11 provided on the flange 2. The flange seating face semicircular grooves 12 are provided so as to extend radially from a central axis O of the measurement pipe 1. The lining flare portion 10b is formed on the surface of the flange seat 11. The lining flare portion 10 may be formed so as to be integrally connected to the resin lining portion 10a.

The resin that has entered the flange seating face semicircular grooves 12 functions as ribs for reinforcing the lining flare portion 10b.

Figure 12:
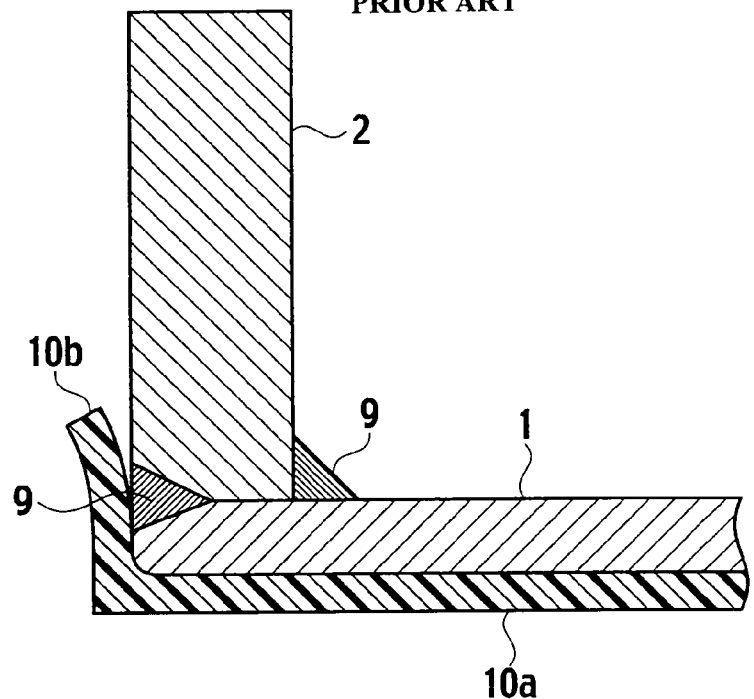
FIG. 12 is a cross-sectional view partially showing a pipe body constituting the conventional electromagnetic flow meter.

If there are no flange seating face semicircular grooves 12, the lining flare portion 10b may be detached from the surface of the flange seat 11 before the pipe (not shown) is connected as shown in FIG. 12. As a result, a sealing property is degraded. In contrast, in the third embodiment, by providing the flange seating face semicircular grooves 12, the resin enters the flange seating face semicircular grooves 12. Accordingly, it is possible to prevent degradation in the sealing property of the lining flare portion 10b caused by detachment from the surface of the flange seat 11.

Figure 13:
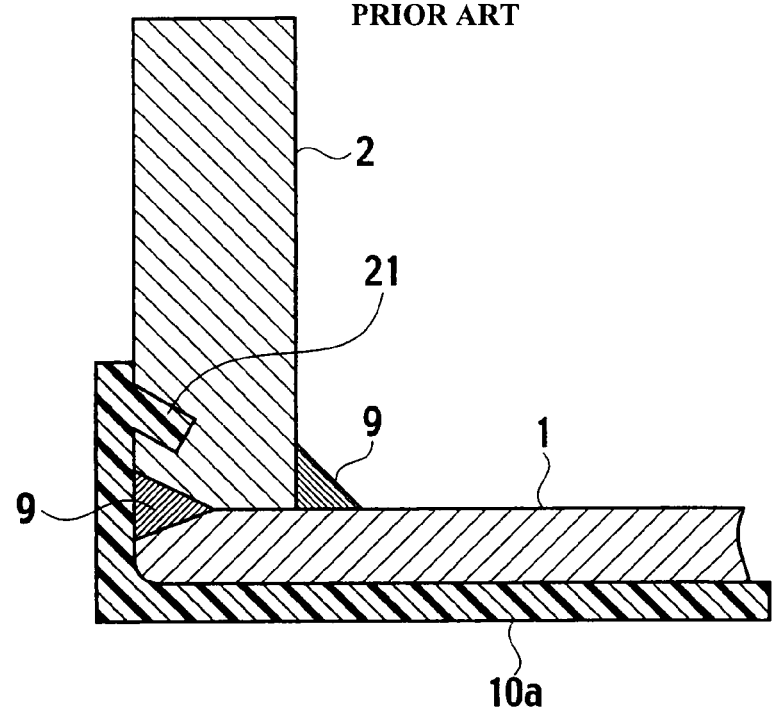
FIG. 13 is a cross-sectional view partially showing another pipe body constituting the conventional electromagnetic flow meter.

Moreover, when an anchor groove 21 is formed in a circumferential shape on the surface of the flange seat 11 as shown in FIG. 13, it is necessary to employ the advanced technique for forming the resin lining, which involves heating the molds to a high temperature and infusing the melted resin at high pressure by use of a pressurizer in order to fill the melted resin into the deepest spot of the anchor groove 21 without bubbles.

In contrast, in the electromagnetic flow meter of the third embodiment, the flange seating face semicircular grooves 12 are formed radially, so that the resin flows into the flange seating face semicircular grooves 12 smoothly and easily. Accordingly, it is possible to form the resin lining merely by pressuring the melted resin inside the molds. Since the grooves have a simple shape, a risk of formation failures of the resin lining attributable to bubbles remaining in the grooves, for example, is reduced, and yields are therefore improved.

Figure 14:
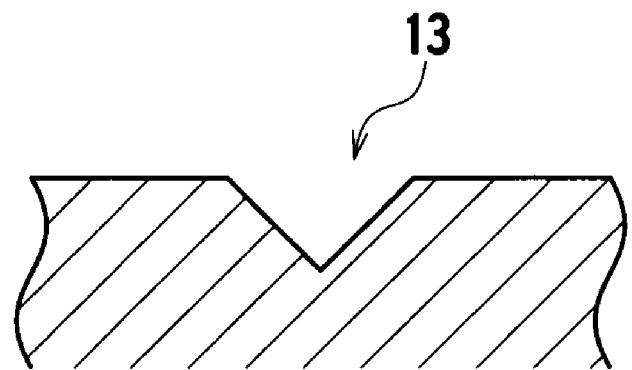
FIG. 14 is a cross-sectional view showing another example of a groove (a triangular groove) to be provided on the pipe body of the electromagnetic flow meter according to the third embodiment of the present invention.
Figure 15:
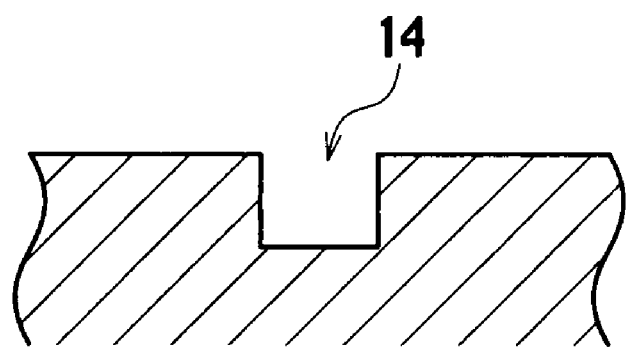
FIG. 15 is a cross-sectional view showing still another example of the groove (a rectangular groove) to be provided on the pipe body of the electromagnetic flow meter according to the third embodiment of the present invention.

In the electromagnetic flow meter according to the third embodiment, the flange seating face semicircular grooves 12 are formed radially on the surface of the flange seat 11. However, instead of the flange seating face semicircular grooves 12, it is also possible to provide triangular grooves (flange seating face triangular grooves) 13 as shown in FIG. 14 or rectangular grooves (flange seating face rectangular grooves) 14 as shown in FIG. 15. In these cases, it is also possible to achieve similar operations and effects to those in the case of providing the flange seating face semicircular grooves 12.

In the electromagnetic flow meter according to the third embodiment shown in FIG. 9, the flange seat 11 is formed on the flange 2, and the flange seating face semicircular grooves 12 are provided radially on the surface of this flange seat 11. However, the semicircular grooves may also be formed directly on the surface of the flange 2 without providing the flange seat 11.

Fourth Embodiment

Figure 16A:
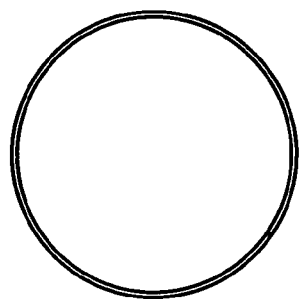
FIG. 16A is a side view of a belt-shaped spiral porous plate used in a pipe body constituting an electromagnetic flow meter according to a fourth embodiment of the present invention.
Figure 16B:
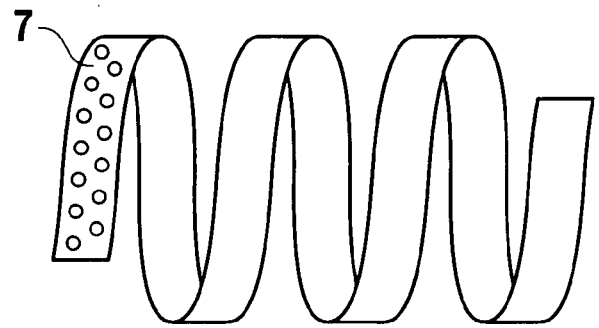
FIG. 16B is a front view of the belt-shaped spiral porous plate.
Figure 16C:
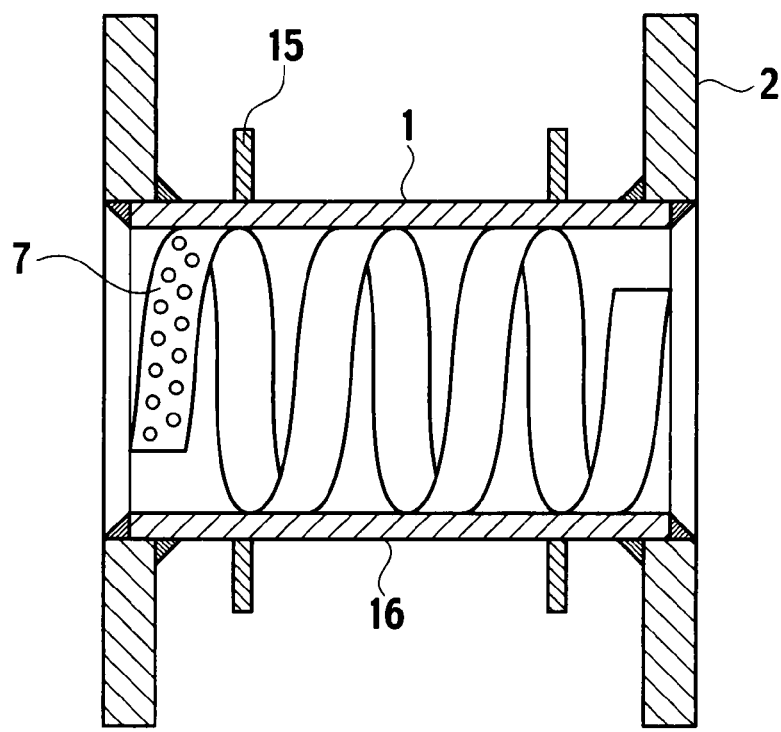
FIG. 16C is a cross-sectional view showing the pipe body of the electromagnetic flow meter employing the belt-shaped spiral porous plate.

FIGS. 16A to 16C show a fourth embodiment of the present invention. In an electromagnetic flow meter according to the fourth embodiment of the present invention, a spiral porous plate having an easy-to-form belt shape (hereinafter referred to as a "belt-shaped spiral porous plate") 7 is attached to the inner surface of the measurement pipe 1 instead of forming the grooves on the inner surface thereof.

FIG. 16A is a side view of the belt-shaped spiral porous plate 7. FIG. 16B is a front view of the belt-shaped spiral porous plate 7. FIG. 16C is a cross-sectional view showing the pipe body 16 to which the belt-shaped spiral porous plate 7 is attached in a state before applying the resin lining thereon. In the following description, the same constituents as those in the configuration of the electromagnetic flow meter according to the first embodiment will be designated by the same reference numerals used in the first embodiment, and duplicate explanations will be omitted.

As shown in FIG. 16A and FIG. 16B, the belt-shaped spiral porous plate 7 is formed by cutting a porous plate into a spiral belt shape instead of a cylindrical shape. The belt-shaped spiral porous plate 7 is continuously attached along the inner surface from an end of the measurement pipe 1. Thereafter, the resin lining portion 10a (which is omitted in FIG. 16C) is formed by performing the resin lining process.

Figure 17:
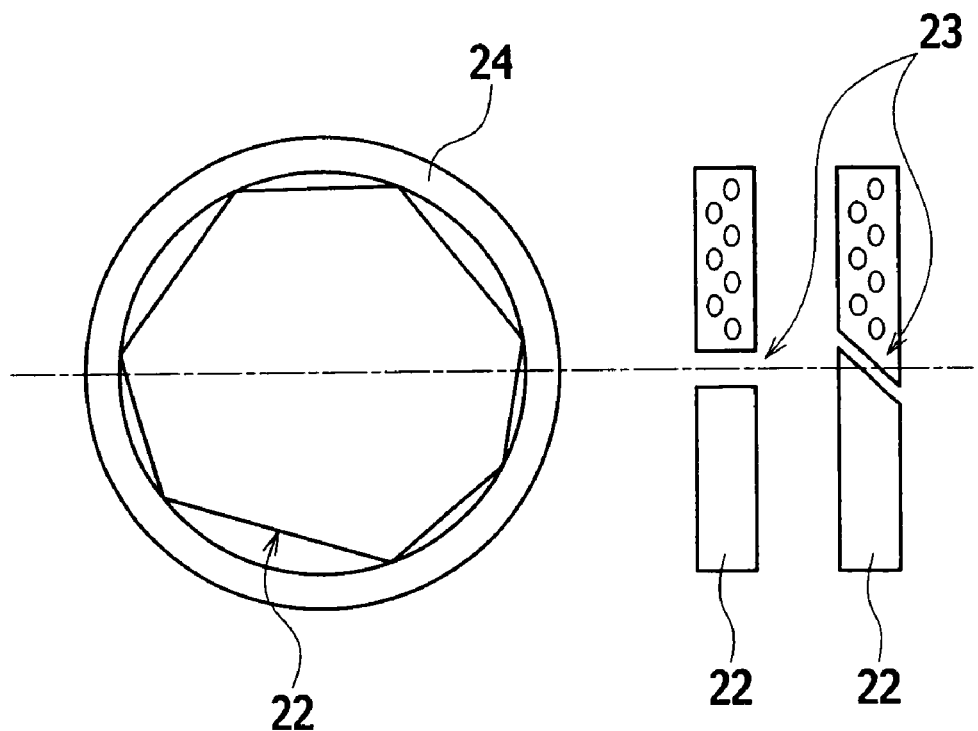
FIG. 17 is a schematic diagram of a pipe body and a belt-shaped spiral porous plate constituting a conventional electromagnetic flow meter, which shows a state where the belt-shaped spiral porous plate is attached to the pipe body.

Therefore, it is possible to form a can easily while disregarding concerns including: generation of a seam 23 as appearing on a conventional porous plate 22 as shown in FIG. 17; a polygonal cross section of the conventional porous plate 22 when attaching the plate to the inner surface of a measurement pipe 24; intermittent contact of the porous plate 22 with the measurement pipe 24; exposure of the porous plate 22 from a surface of a lining (not shown); and so forth.

According to the electromagnetic flow meter of the fourth embodiment, no grooves are formed on the inner surface of the measurement pipe 1. Therefore, it is possible to attach the belt-shaped spiral porous plate 7 consecutively after manufacturing the pipe body 16 by welding. Moreover, it is easy to form the electromagnetic flow meter and to reduce a production period. Hence it is possible to achieve cost reduction.

In addition, certain intervals are formed by the belt-shaped spiral porous plate 7 disposed in parallel. Therefore, the melted resin is filled into the holes and the clearances between the measurement pipe 1 and the belt-shaped spiral porous plate 7 through these intervals formed by the belt-shaped spiral porous plate 7 only by pressurizing the melted resin inside the molds. That is, it is possible to form the resin lining without using an advanced forming technique that involves heating the molds to a high temperature and infusing the melted resin at high pressure by use of a pressurizer.

INDUSTRIAL APPLICABILITY

The present invention is applicable to a water meter, a gas meter, and so forth.

What is claimed is:

1. An electromagnetic flow meter comprising:
   a measurement pipe in which a measurement target fluid flows;
   a resin lining portion formed on an inner surface of the measurement pipe;
   flanges provided at both ends of the measurement pipe; and
   lining flare portions each formed on a surface of the flanges, the lining flare portions being integrally connected to the resin lining portion;
   wherein the inner surface of the measurement pipe includes a first groove in a circumferential direction thereof, and a cross-section of the first groove in the circumferential direction is any of a semicircular shape, a rectangular shape, and a triangular shape; and
   wherein each flange includes a second groove whose cross-section is any of a semicircular shape, a rectangular shape, and a triangular shape, and is formed radially from a center of the measurement pipe.

2. The electromagnetic flow meter according to claim 1, wherein the first groove is inclined relative to the inner surface at a predetermined angle.

3. The electromagnetic flow meter according to claim 1, wherein the measurement pipe further includes a rectangular groove provided at a ridge portion formed by a cut surface of an end thereof and the inner surface thereof, the rectangular groove being inclined relative to the inner surface at a predetermined angle.

* * * * *